(12) United States Patent
Sekiguchi et al.

(10) Patent No.: US 10,808,658 B2
(45) Date of Patent: Oct. 20, 2020

(54) CONNECTION STATE DETERMINATION DEVICE FOR BREATHER PIPE

(71) Applicant: Honda Motor Co., Ltd., Tokyo (JP)

(72) Inventors: Toru Sekiguchi, Saitama (JP); Masahiro Fujii, Saitama (JP); Atsuhiro Miyauchi, Saitama (JP); Takashi Konomoto, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 16/115,588

(22) Filed: Aug. 29, 2018

(65) Prior Publication Data

US 2019/0072059 A1 Mar. 7, 2019

(30) Foreign Application Priority Data

Sep. 4, 2017 (JP) .................. 2017-169175

(51) Int. Cl.
*F01M 13/02* (2006.01)
*F02M 35/10* (2006.01)
(Continued)

(52) U.S. Cl.
CPC ...... *F02M 35/1038* (2013.01); *F01M 13/022* (2013.01); *F02M 26/47* (2016.02);
(Continued)

(58) Field of Classification Search
CPC ......... F02M 35/10222; F02M 35/1038; F02M 35/10157; F02M 26/47; F02M 25/06;
(Continued)

(56) References Cited

U.S. PATENT DOCUMENTS 5,205,265 A * 4/1993 Kashiyama ............. F02D 21/08
123/568.12
2009/0195374 A1 8/2009 Usukura et al.
(Continued)

FOREIGN PATENT DOCUMENTS

| CN | 104074635 | 10/2014 |
|----|-----------|---------|
| JP | 2003028840 | 1/2003 |

(Continued)

OTHER PUBLICATIONS

"Office Action of Japan Counterpart Application", dated Apr. 9, 2019, with English translation thereof, p. 1-p. 7.
(Continued)

*Primary Examiner* — Hai H Huynh
*Assistant Examiner* — Gonzalo Laguarda
(74) *Attorney, Agent, or Firm* — JCIPRNET

(57) ABSTRACT

Provided is a connection state determination device. The connection state determination device for the breather pipe determines the connection state of a breather pipe in an internal combustion engine having a supercharger, and the breather pipe is connected between an engine body including a crank case and an intake passage on the upstream side of a compressor of the supercharger, and communicates the crank case and the intake passage. The connection state determination device includes a pipe internal pressure sensor that detects the pressure inside the breather pipe, a pulsation waveform obtaining part for obtaining pulsation due to the variation of pressure inside the breather pipe as a pulsation waveform based on the detected pressure, and a connection state determination part that determines the connection state of the breather pipe based on the pulsation waveform.

3 Claims, 13 Drawing Sheets

(51) Int. Cl.
  *F02M 26/47*  (2016.01)
  *G01M 15/06*  (2006.01)
  *G01M 15/09*  (2006.01)
  *F02D 41/22*  (2006.01)
  *F01M 13/00*  (2006.01)
  *F02M 25/06*  (2016.01)

(52) U.S. Cl.
  CPC .......... *F02M 35/10157* (2013.01); *F02M 35/10222* (2013.01); *G01M 15/06* (2013.01); *G01M 15/09* (2013.01); *F01M 13/00* (2013.01); *F02D 41/22* (2013.01); *F02M 25/06* (2013.01); *Y02T 10/40* (2013.01)

(58) Field of Classification Search
  CPC ..... F01M 13/00; F01M 13/022; G01M 15/06; G01M 15/09; F02D 41/22; Y02T 10/40
  USPC ................................................ 123/572–574
  See application file for complete search history.

(56) References Cited

U.S. PATENT DOCUMENTS

| | | | | |
|---|---|---|---|---|
| 2013/0282255 | A1* | 10/2013 | Pursifull | G01F 23/0076 701/102 |
| 2014/0076249 | A1* | 3/2014 | Rollinger | F01M 11/00 123/41.86 |
| 2014/0081548 | A1* | 3/2014 | Pursifull | F02M 35/10222 701/101 |
| 2014/0081549 | A1* | 3/2014 | Rollinger | F01M 13/00 701/101 |
| 2014/0081550 | A1* | 3/2014 | Jentz | F01M 1/18 701/101 |
| 2014/0081551 | A1* | 3/2014 | Rollinger | F01M 11/10 701/101 |
| 2014/0081564 | A1* | 3/2014 | Pursifull | F02M 35/10222 701/113 |
| 2015/0047615 | A1* | 2/2015 | Rollins | F02M 25/0836 123/520 |
| 2016/0097355 | A1* | 4/2016 | Jentz | F01M 11/10 701/102 |
| 2016/0348614 | A1* | 12/2016 | Dudar | F02M 25/0809 |
| 2017/0256103 | A1* | 9/2017 | Wang | F01M 13/00 |
| 2017/0268448 | A1* | 9/2017 | Takahashi | F01M 13/023 |
| 2018/0291830 | A1* | 10/2018 | Kurosawa | F02M 25/06 |
| 2018/0371971 | A1* | 12/2018 | Nakano | F02D 41/22 |

FOREIGN PATENT DOCUMENTS

| | | |
|---|---|---|
| JP | 2011027073 | 2/2011 |
| JP | 2017115584 | 6/2017 |
| WO | 2017068920 | 4/2017 |

OTHER PUBLICATIONS

"Office Action of China Counterpart Application", with English translation thereof, dated May 15, 2020, p. 1-p. 12.

* cited by examiner

CONNECTION STATE DETERMINATION DEVICE FOR BREATHER PIPE

CROSS-REFERENCE TO RELATED APPLICATION

This application claims the priority benefit of Japan application serial no. 2017-169175, filed on Sep. 4, 2017. The entirety of the above-mentioned patent application is hereby incorporated by reference herein and made a part of this specification.

BACKGROUND

Technical Field

The disclosure relates to a connection state determination device for a breather pipe in an internal combustion engine having a supercharger, and the connection state determination device determines the connection state of the breather pipe connected between an engine body including a crank case and the upstream side of a compressor in an intake passage.

Description of Related Art

Conventionally, a PCV hose and a breather pipe for communicating a crank case and an intake system and making blowby gas inside the crank case flow into the intake system are disposed in an internal combustion engine having a supercharger. The PCV hose is connected between the crank case and an intake manifold, and blowby gas inside the crank case is sucked by negative pressure in the intake manifold and burned inside each of cylinders. On the other hand, the breather pipe is connected between the crank case and a predetermined position in the upstream side of the compressor in the intake passage. In the breather pipe, air flows from the intake passage side to the crank case side at the time of natural intake, and blowby gas inside the crank case flows from the crank case side to the intake passage side by suction caused by negative pressure of the compressor at the time of supercharge.

It is required that the breather pipe is air-tightly connected between the crank case and the intake passage by both end portions thereof to be firmly and properly connected to the crank case and the intake passage respectively, and as a determination device that determines the connection state of the breather pipe, the one disclosed in Patent Document 1 is known, for example.

In the determination device of Patent Document 1, a pressure sensor that detects pressure inside a crank case vent tube (hereinafter, referred to as "crank case vent tube pressure") is disposed to the crank case vent tube, which corresponds to the breather pipe mentioned above. The damage of the crank case ventilation system, such as the quality of the connection state of the crank case vent tube, for example, is determined based on an integration value obtained by integrating the crank case vent tube pressure actually detected by the pressure sensor (hereinafter, referred to as "actual crank case vent tube pressure") for a predetermined period of time and an integration value obtained by integrating the crank case vent tube pressure estimated on the same operation condition of the internal combustion engine (hereinafter, referred to as "estimated crank case vent tube pressure") for the same predetermined period of time. Specifically, the quality of the connection state of the crank case vent tube is determined by comparing the integration value of the actual crank case vent tube pressure during a transitional engine airflow period to the integration value of the estimated crank case vent tube pressure during the same period, or by comparing the ratio of the integration value of the actual crank case vent tube pressure during a steady-state engine airflow period and the integration value of the estimated crank case vent tube pressure during the same period to a predetermined threshold.

PRIOR ART LITERATURE

Patent Literature

[Patent Document 1] U.S. Patent Application Publication No. 2016/0097355.

However, the conventional determination device described above does not perform the determination until the intake quantity reaches a predetermined threshold when the intake quantity of the internal combustion engine is not sufficiently high, and, as a result, performs the determination only in a relatively narrow range of the operation state. Also, the determination of the connection state of the crank case vent tube to the crank case is performed based on the integration value of the actual crank case vent tube pressure during a predetermined period of time at the start-up of the internal combustion engine. Therefore, when the execution condition for the determination is not satisfied at the start-up, the determination of the connection state of the crank case vent tube to the crank case may not be performed. As described above, the conventional determination device can perform the determination only in a relatively narrow range of the operation state, and it cannot be said that the precision of the determination is sufficient.

SUMMARY

The present disclosure provides a connection state determination device for the breather pipe that is capable of precisely determining the quality of the connection state of the breather pipe under a wide range of the operation state and in a short period of time.

(1) A connection state determination device for a breather pipe of an embodiment of the present disclosure determines the connection state of the breather pipe 43 in an internal combustion engine 3 having a supercharger 14. The breather pipe 43 is connected between an engine body (engine body 3A) including a crank case 3a and an intake passage (intake tube 5) on the upstream side of a compressor 14a of the supercharger 14, and communicates the crank case and the intake passage. The connection state determination device includes a pipe internal pressure sensor 51 that detects pressure (pipe internal pressure PIP) inside the breather pipe, a pulsation waveform obtaining part (ECU 2) for obtaining pulsation due to the variation of pressure inside the breather pipe as a pulsation waveform based on the detected pressure, and a connection state determination part (ECU 2) that determines the connection state of the breather pipe based on the pulsation waveform.

According to the configuration, the breather pipe is connected between the engine body including the crank case and the intake passage on the upstream side of the compressor of the supercharger, and communicates the crank case and the intake passage. When the internal combustion engine is in the operation state under the natural intake, a part of intake air (hereinafter, simply referred to as "intake air") flows from the intake passage side to the crank case side via the breather pipe. When the internal combustion engine is in the supercharge operation state, blowby gas inside the crank case flows from the crank case side to the intake passage side via the breather pipe by negative pressure generated by the compressor of the supercharger. Also, in the breather pipe, variation of the pressure (hereinafter, referred to as "pipe internal pressure") inside the breather pipe is repeated as the pipe internal pressure becomes high or low due to the movement of the piston in the internal combustion engine, and so-called pulsation is generated. The pipe internal pressure described above is detected by the pipe internal pressure sensor, and the pulsation of the pressure (hereinafter, referred to as "pressure pulsation" where appropriate) inside the breather pipe is obtained as the pulsation waveform based on the detection result. Then, the connection state of the breather pipe is determined by the connection state determination part based on the pulsation waveform.

When the breather pipe is properly connected between the engine body and the upstream side of the compressor in the intake passage, the pulsation waveform of the pipe internal pressure is obtained as a waveform having sufficient amplitude. On the contrary, when the air-tight state of the connection part of the breather pipe is not obtained due to detachment of the breather pipe from the engine body, etc., sufficient amplitude cannot be obtained in the pulsation waveform of the pipe internal pressure. Such pulsation of the pipe internal pressure occurs under a relatively wide range of the operation state, from the low load state to the high load state, of the internal combustion engine, and repeatedly occurs in a short period of time. Accordingly, by checking the pulsation (pulsation waveform) of the pipe internal pressure, the connection state of the breather pipe can be precisely determined under a relatively wide range of the operation state of the internal combustion engine and in a short period of time.

(2) According to an embodiment, in the connection state determination device described in (1), an intake passage side pipe connection part (intake tube side pipe mounting part 5c) for connecting an end portion of the breather pipe is disposed to the intake passage, and the pipe internal pressure sensor 51B is attached to the intake passage side pipe connection part, and the connection state determination part determines the connection state of the breather pipe based on the amplitude of the pulsation waveform when the load of the internal combustion engine is in a predetermined low load range.

According to the configuration, the intake passage side pipe connection part for connecting an end portion of the breather pipe is disposed to the intake passage, and the pipe internal pressure sensor is disposed to the intake passage side pipe connection part. The connection state of the breather pipe is determined by the connection state determination part based on the amplitude of the pulsation waveform of the pipe internal pressure when the load of the internal combustion engine is in the predetermined low load range.

As described later, in the case where the breather pipe is properly connected, the pressure pulsation inside the breather pipe is dominantly caused by the propagation of the pressure on the crank case side when the load of the internal combustion engine is in the predetermined low load range. On the contrary, when the load of the internal combustion engine is in a predetermined high load range, the pressure pulsation inside the breather pipe is dominantly caused by the propagation of the pressure on the intake passage side. In addition, the pressure pulsation inside the breather pipe is relatively small under the operation state of the internal combustion engine in the low load range. On the contrary, the pressure pulsation inside the breather pipe is larger under the operation state of the internal combustion engine in the high load range, compared to the pressure pulsation in the low load range. From the above, for example, when the breather pipe is detached from either the engine body or the intake passage, the pipe internal pressure sensor disposed to the intake passage side pipe connection part only detects the pressure on the intake passage side, and since almost no air flows in the intake passage in the low load region, the detected value of the pressure pulsation is almost 0. Accordingly, when the load of the internal combustion engine is in the predetermined low load region, the connection state of the breather pipe can be precisely determined by checking the amplitude of the pulsation waveform from the pressure pulsation detected by the pipe internal pressure sensor disposed to the intake passage side pipe connection part.

(3) According to an embodiment, in the connection state determination device described in (1), an engine body side pipe connection part (engine side pipe mounting part 3c) for connecting the other end portion of the breather pipe is disposed to the engine body, and the pipe internal pressure sensor 51A is attached to the engine body side pipe connection part, and the connection state determination part determines the connection state of the breather pipe based on the amplitude of the pulsation waveform when the load of the internal combustion engine is in a predetermined high load range that is higher than the low load range.

According to the configuration, the engine body side pipe connection part for connecting the other end portion of the breather pipe is disposed to the engine body, and the pipe internal pressure sensor is disposed to the engine body side pipe connection part. The connection state of the breather pipe is determined by the connection state determination part based on the amplitude of the pulsation waveform of the pipe internal pressure when the load of the internal combustion engine is in the predetermined high load range, which is higher than the low load range.

When the breather pipe is detached from either the engine body or the intake passage, since the pipe internal pressure sensor disposed to the engine body side pipe connection part only detects the pressure on the engine body side, the amplitude of the pulsation waveform from the pressure pulsation detected by the pipe internal pressure sensor becomes significantly small in the high load region. Accordingly, when the load of the internal combustion engine is in the predetermined high load region, the connection state of the breather pipe can be precisely determined by checking the amplitude of the pulsation waveform from the pressure pulsation detected by the pipe internal pressure sensor disposed to the engine body side pipe connection part.

(4) According to an embodiment, the connection state determination device described in any one of (1) to (3) further includes a sine/cosine component coefficient calculation part (ECU 2, Step 4) that calculates a sine component coefficient and a cosine component coefficient respectively correlated with the amplitude of a sine wave and the amplitude of a cosine wave of a predetermined frequency by multiplying a Fourier series corresponding to the pulsation waveform by the sine wave and the cosine wave of the predetermined frequency respectively, and integrating the result for one cycle of the pulsation waveform, an amplitude coefficient obtaining part (ECU 2, Step 5) that obtains an amplitude coefficient R correlated with the amplitude of the pulsation waveform by calculating a square root value of the sum of squares of the sine component coefficient and the cosine component coefficient, and an amplitude coefficient integration value obtaining part (ECU 2, Step 6) that obtaining an amplitude coefficient integration value RINV1 by integrating the amplitude coefficient for multiple cycles that is predetermined, and the connection state determination part determines the connection state of the breather pipe by comparing the amplitude coefficient integration value to a predetermined first determination threshold RINV_TH (Step 7 of FIG. 7).

According to the configuration, a Fourier series corresponding to the pulsation waveform is multiplied by the sine wave and the cosine wave of the predetermined frequency respectively, and then the result is integrated for one cycle of the pulsation waveform. Since the pulsation waveform can be indicated by a combination of multiple sine waves and cosine waves of different frequencies by using a Fourier series, by multiplying the Fourier series by the sine wave of the predetermined frequency and integrating the result for one cycle of the pulsation waveform, only the multiplication result of the sine waves of the same frequency remains, and the other multiplied terms of sine waves of frequencies different to each other and the multiplied terms of all the cosine waves become the value of zero. Similarly, by multiplying a Fourier series by the cosine wave of the predetermined frequency and integrating the result for one cycle of the pulsation waveform, only the multiplication result of the cosine waves of the same frequency remains, and the other multiplied terms of cosine waves of frequencies different to each other and the multiplied terms of all the sine waves become the value of zero. Then, the sine component coefficient, which is the coefficient of the multiplied term of the remaining sine wave, and the cosine component coefficient, which is the coefficient of the multiplied term of the remaining cosine wave, are calculated. The sine component coefficient and the cosine component coefficient are correlated with respective amplitude of the sine wave and the cosine wave of the predetermined frequency in the pulsation waveform.

The amplitude coefficient correlated with the amplitude of the pulsation waveform is obtained by calculating the square root value of the sum of squares of the sine component coefficient and the cosine component coefficient, and the amplitude coefficient integration value is obtained by integrating the amplitude coefficient for the predetermined multiple cycles. Then, the connection state of the breather pipe is determined by comparing the amplitude coefficient integration value to the predetermined first determination threshold. The amplitude of the pulsation waveform can be quantified by using the above-mentioned amplitude coefficient, and by comparing the amplitude coefficient integration value obtained by integrating the amplitude coefficient for multiple cycles to the appropriately set first determination threshold, the connection state of the breather pipe can be determined while improving the precision of the determination.

(5) According to an embodiment, the connection state determination device described in any one of (1) to (3) further includes an amplitude absolute value calculation part (ECU 2, Step 22) that calculates an amplitude absolute value by integrating the absolute value of the amplitude of the pulsation waveform in one cycle, and an obtaining part for the integration value of the amplitude absolute values (ECU2, Step 22) that obtains an integration value of the amplitude absolute values RIVN2 by integrating the amplitude absolute value for multiple cycles that is predetermined, and the connection state determination part determines the connection state of the breather pipe by comparing the integration value of the amplitude absolute values to a predetermined second determination threshold RINV2_TH (Step 23 of FIG. 8).

According to the configuration, the amplitude absolute value is calculated by integrating the absolute value of the amplitude of the pulsation waveform in one cycle, and the integration value of the amplitude absolute values is obtained by integrating the amplitude absolute value for the predetermined multiple cycles. According to the configuration, the connection state of the breather pipe is determined by integrating the absolute value of the amplitude of the pulsation waveform for one cycle and then comparing the integration value of the amplitude absolute values to the predetermined second threshold. The amplitude of the pulsation waveform can be quantified by the above-mentioned amplitude absolute value, and by comparing the integration value of the amplitude absolute values obtained by integrating the amplitude absolute value for multiple cycles to the appropriately set second determination threshold, the connection state of the breather pipe can be determined while improving the precision of the determination.

(6) According to another embodiment, the connection state determination device described in any one of (1) to (3) further includes an amplitude difference calculation part (ECU 2, Step 31) that calculates a difference Rd between a maximum value Rmax and a minimum value Rmin of the amplitude of the pulsation waveform in one cycle, and an amplitude difference integration value obtaining part (ECU 2, Step 31) that obtains an amplitude difference integration value RINV3 by integrating the difference for multiple cycles that is predetermined, and the connection state determination part determines the connection state of the breather pipe by comparing the amplitude difference integration value to a predetermined third determination threshold RINV3_TH (FIG. 9, Step 32).

According to the configuration, the amplitude difference integration value is obtained by calculating the difference between the maximum value and the minimum value of the amplitude of the pulsation waveform in one cycle, and then integrating the difference for the predetermined multiple cycles. Then, the connection state of the breather pipe is determined by comparing the amplitude difference integration value and the predetermined third determination threshold. The amplitude of the pulsation waveform can be quantified by the above-mentioned difference, and by comparing the amplitude difference integration value obtained by integrating the difference for multiple cycles to the appropriately set third determination threshold, the connection state of the breather pipe can be determined while improving the precision of the determination.

(7) According to an embodiment, the connection state determination device described in any one of (1) to (3) further includes a threshold exceeding period measurement part (ECU 2, Step 41) that measures a period of time during which a predetermined threshold LE is exceeded in the amplitude of the pulsation waveform in one cycle as a threshold exceeding period, and a threshold exceeding period integration value obtaining part (ECU 2, Step 41) that obtains a threshold exceeding period integration value RINV4 by integrating the threshold exceeding period for multiple cycles that is predetermined, and the connection state determination part determines the connection state of the breather pipe by comparing the threshold exceeding period integration value to a predetermined fourth threshold RINV4_TH (FIG. 10, Step 42).

According to the configuration, the threshold exceeding period is obtained by measuring a period of time during which the predetermined threshold is exceeded in the amplitude of the pulsation waveform in one cycle as the threshold exceeding period, and integrating the threshold exceeding period for the predetermined multiple cycles. Then, the connection state of the breather pipe is determined by comparing the threshold exceeding period integration value to the predetermined fourth determination threshold. The amplitude of the pulsation waveform can be quantified by the above-mentioned threshold exceeding period, and by comparing the threshold exceeding period integration value obtained by integrating the threshold exceeding period for multiple cycles to the appropriately set fourth determination threshold, the connection state of the breather pipe can be determined while improving the precision of the determination.

BRIEF DESCRIPTION OF THE DRAWINGS

FIG. 4A is a diagram illustrating a flow of pressure transmission generating the pulsation of the pressure inside the breather pipe, and FIG. 4B is a diagram illustrating the relationship between the intake pressure and the pressure pulsation under multiple engine speeds.

FIG. 5A is an enlarged view illustrating the breather pipe and the surrounding thereof, and FIG. 5B is a graph illustrating the intake pressure and the pressure pulsation under multiple engine speeds.

FIG. 6A is an enlarged view illustrating the breather pipe and the surrounding thereof, and FIG. 6B is a graph illustrating the intake pressure and the pressure pulsation under multiple engine speeds.

FIG. 11A is an example of the pulsation waveform based on the detection result of the pipe internal pressure sensor.

FIG. 11B is an example of the pulsation waveform after applying the disturbance removal process to the pulsation waveform of FIG. 11A. FIG. 11C is an image diagram of the calculation process of the amplitude absolute value by integrating the absolute value of the amplitude of the pulsation waveform of FIG. 11B. FIG. 11D is an image diagram of the determination method of the connection state of the breather pipe by integrating the amplitude absolute values.

FIGS. 12A to 12D are similar diagrams to FIGS. 11A to 11D.

FIGS. 13A to 13D are similar diagrams to FIGS. 11A to 11D.

DESCRIPTION OF THE EMBODIMENTS

Figure 1:
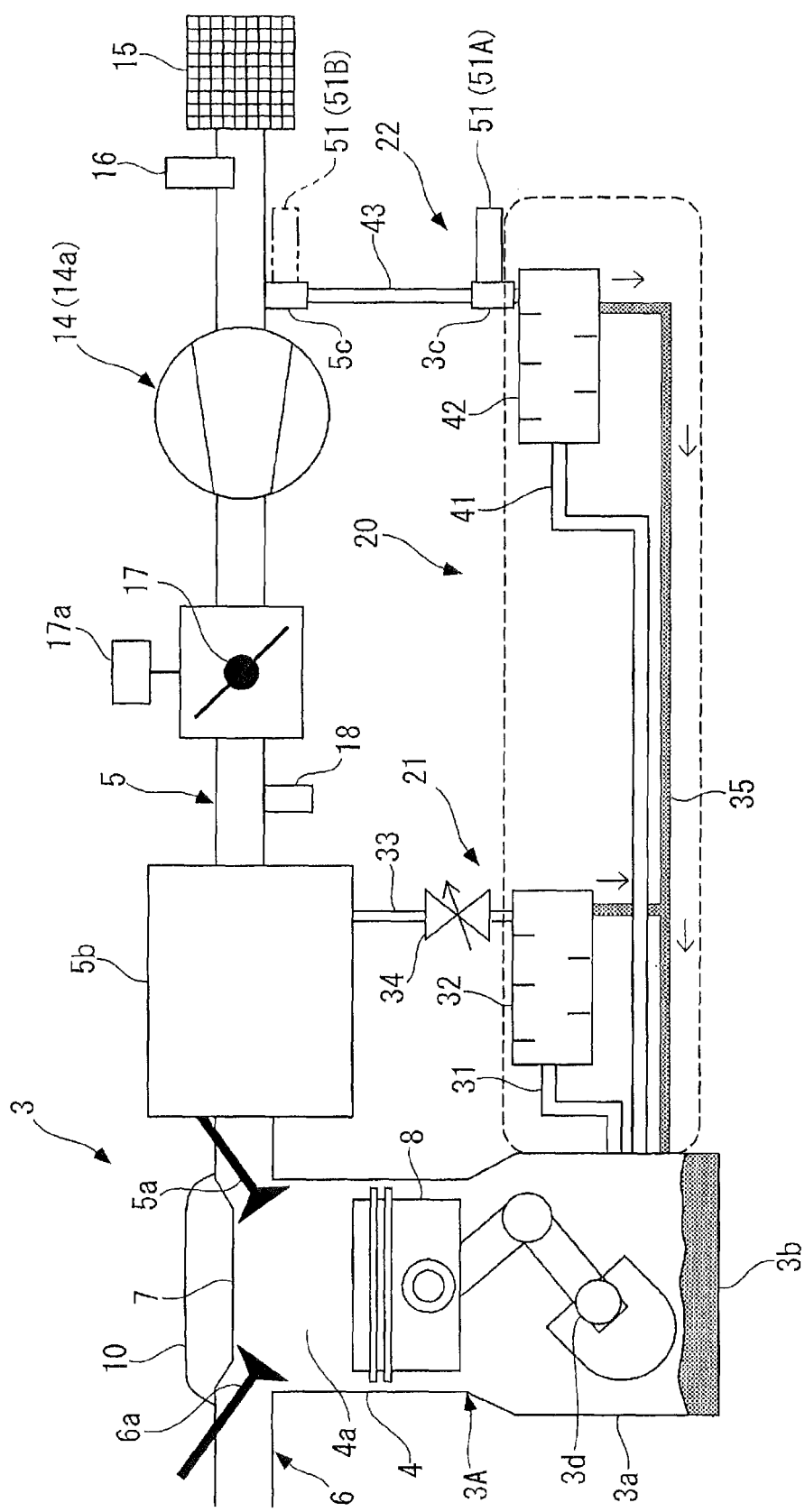
FIG. 1 is a diagram illustrating a schematic configuration of a connection state determination device for the breather pipe according to an embodiment of the present disclosure.

Preferable embodiments of the present disclosure are described with reference to the drawings. FIG. 1 schematically illustrates an internal combustion engine (hereinafter, referred to as "engine") 3 that applies a connection state determination device for the breather pipe according to an embodiment of the present disclosure. The engine 3 a petrol engine that is mounted on a vehicle (not depicted) as the power source. As shown in FIG. 1, the engine 3 includes four cylinders 4 (only one cylinder is depicted), an intake tube 5 (intake passage) for introducing air to the cylinders 4, an exhaust tube 6 (exhaust passage) for discharging exhaust gas, a cylinder head 7 that has an intake valve 5a and an exhaust valve 6a for each of the cylinders 4, a piston 8 that is disposed for each of the cylinders 4, and the like. A combustion chamber 4a is partitioned between the piston 8 of each of the cylinders 4 and the cylinder head 7.

Figure 2:
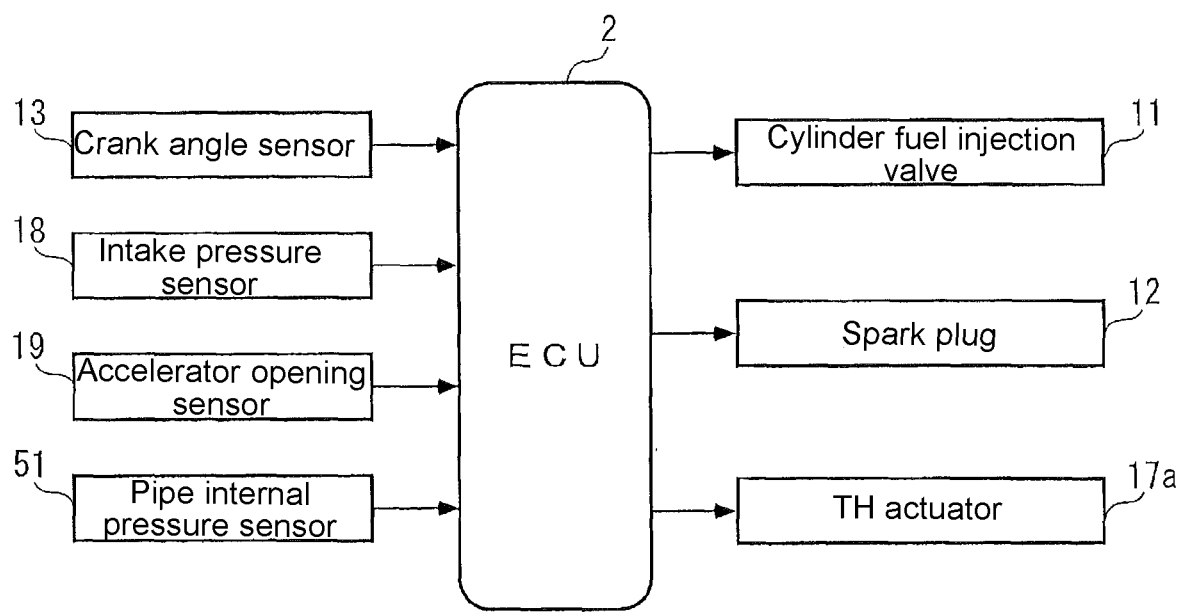
FIG. 2 is a block diagram of a control device of an internal combustion engine including the connection state determination device.

The intake tube 5 and the exhaust tube 6 are connected to the cylinder head 7 of the engine 3, and a cylinder fuel injection valve 11 and a spark plug 12 (refer to FIG. 2) are attached to the cylinder head 7 so as to face the combustion chamber 4a, for each of the cylinders 4.

Also, a crank angle sensor 13 (refer to FIG. 2) is disposed to a crank shaft 3d of the engine 3. The crank angle sensor 13 outputs a CRK signal and a TDC signal that are pulse signals, to an ECU 2 as the crank shaft 3 rotates. The CRK signal is output for every predetermined crank angle (30 degrees, for example). The ECU 2 calculates the speed NE of the engine 3 (hereinafter, referred to as "engine speed") based on the CRK signal. The TDC signal indicates that the piston 8 is at a predetermined crank angle position close to TDC (Top Dead Center) at the start time of the intake stroke in any one of the cylinders 4, and in this example of the four-cylinder type, the TDC signal is output every 180 degrees of the crank angle.

Also, a supercharger 14 that consists of a turbocharger is disposed to the engine 3. The supercharger 14 has a compressor 14a disposed to the intake tube 5 and a turbine (not depicted) disposed to the exhaust tube 6, and the compressor 14a and the turbine are integrally connected via a shaft. The supercharger 14 performs the supercharge operation which pressurizes the intake air inside the intake tube 5 by the compressor 14a which is integrated with the turbine and is rotationally driven as the turbine is rotationally driven by the exhaust gas inside the exhaust tube 6.

An air filter 15 for removing foreign matters, dirt and the like is disposed to the intake tube 5 on the upstream side of the compressor 14a, and an air flow meter 16 that detects the intake air quantity flowing in the intake tube 5 through the air filter 15 is disposed to the intake tube 5 on the downstream side of the air filter 15. A throttle valve 17 is disposed to the intake tube 5 on the downstream side of the compressor 14a. The opening of the throttle valve 17 is controlled by driving a TH actuator 17a according to a control signal from the ECU 2, and thereby, the intake air quantity sucked into the engine 3 is controlled.

Also, an intake pressure sensor 18 is disposed to the intake tube 5 on the downstream side of the throttle valve 17. The intake pressure sensor 18 detects pressure (hereinafter, referred to as "intake pressure") PBA inside the intake tube 5 and outputs the detection signal to the ECU 2. The air passed through the throttle valve 17 is supplied to each of the cylinders 4 via an intake manifold 5b having multiple branch pipes (not depicted).

Moreover, an accelerator opening sensor 19 (refer to FIG. 2) is connected to the ECU 2. When the driver of the vehicle steps on the acceleration pedal (not depicted), a detection signal indicating opening of the accelerator (hereinafter, referred to as "accelerator opening") AP is output to the ECU 2.

Also, a blowby gas reduction device 20 that returns the blowby gas inside the crank case 3a to the intake system is disposed to the engine 3. The blowby gas reduction device 20 has the first reduction device 21 and the second reduction device 22 that return the blowby gas to the intake tube 5 respectively on the upstream side and the downstream side.

The first reduction device 21 is configured with the first gas passage 31 that communicates to the crank case 3a, an oil separator 32 that separates engine oil from the blowby gas flowing the first gas passage 31, a PCV pipe 33 for introducing the blowby gas passed through the oil separator 32 to the intake manifold 5b, a PCV valve 34 that is disposed to the PCV pipe 33 and has a check valve, and the like. The engine oil separated by the oil separator 32 is returned to an oil pan 3b at the bottom of the crank case 3a via an oil circulation passage 35. In FIG. 1, the first reduction device 21 and the second reduction device 22 are indicated outside the body of the engine 3 (hereinafter, referred to as "engine body 3A" as appropriate) including the crank case 3a and the like, for convenience of depiction, but a large portion of the first reduction device 21 and the second reduction device 22 described later (the portion enclosed by dashed lines) is integrally incorporated into the engine body 3A and a head cover 10.

The second reduction device 22 is configured with the second gas passage 41 that communicates to the crank case 3a, an oil separator 42 that separates engine oil from the blowby gas flowing the second gas passage 41, a breather pipe 43 for introducing the blowby gas passed through the oil separator 42 to the intake tube 5 on the upstream side of the compressor 14a and for introducing the air sucked into the intake tube 5 to the inside of the crank case 3a via the second gas passage 41, and the like. The oil separated by the oil separator 42 is returned to the oil pan 3b at the bottom of the crank case 3a via the oil circulation passage 35, as the same as the first reduction device 21.

The end portions of the breather pipe 43 are attached in the air-tight state respectively to an engine side pipe mounting part 3c (engine body side pipe connection part) disposed on the side of the body of the engine 3 and an intake tube side pipe mounting part 5c (intake passage side pipe connection part) disposed to a predetermined position of the intake tube 5.

Moreover, the pipe internal pressure sensor 51 for detecting the pressure PIP inside the breather pipe 43 (hereinafter, referred to as "pipe internal pressure") is disposed to either the engine side pipe mounting part 3c or the intake tube side pipe mounting part 5c. In FIG. 1, the state in which the pipe internal pressure sensor 51 is disposed to the engine side pipe mounting part 3c is indicated with the solid lines, and the state in which the pipe internal pressure sensor 51 is disposed to the intake tube side pipe mounting part 5c is indicated with the long dashed double-short dashed line. In the description below, when the pipe internal pressure sensor 51 mounted to the engine side pipe mounting part 3c and the pipe internal pressure sensor 51 mounted to the intake tube side pipe mounting part 5c are particularly distinguished, a reference numeral of "51A" is assigned to the pipe internal pressure sensor 51 mounted to the engine side pipe mounting part 3c, and a reference numeral of "51B" is assigned to the intake tube side pipe mounting part 5c.

The ECU 2 is configured with a microcomputer including an I/O interface, a CPU, a RAM, a ROM (all of these are not depicted) and the like. Detection signals from the various sensors described above are input to the CPU after A/D conversion and shaping are performed at the I/O interface. The CPU determines the operation state of the engine 3 and executes the connection state determination process of the breather pipe 43 of the second reduction device 22 according to the program stored in the ROM. In this embodiment, the pulsation waveform obtaining part, the connection state determination part, the sine/cosine component coefficient calculation part, the amplitude coefficient obtaining part, the amplitude coefficient integration value obtaining part, the amplitude absolute value calculation part, the obtaining part of the integration value of the amplitude absolute value, the amplitude difference calculation part, the amplitude difference integration value obtaining part, the threshold exceeding period measurement part, and the threshold exceeding period integration value obtaining part are configured by the ECU 2.

Figure 3:
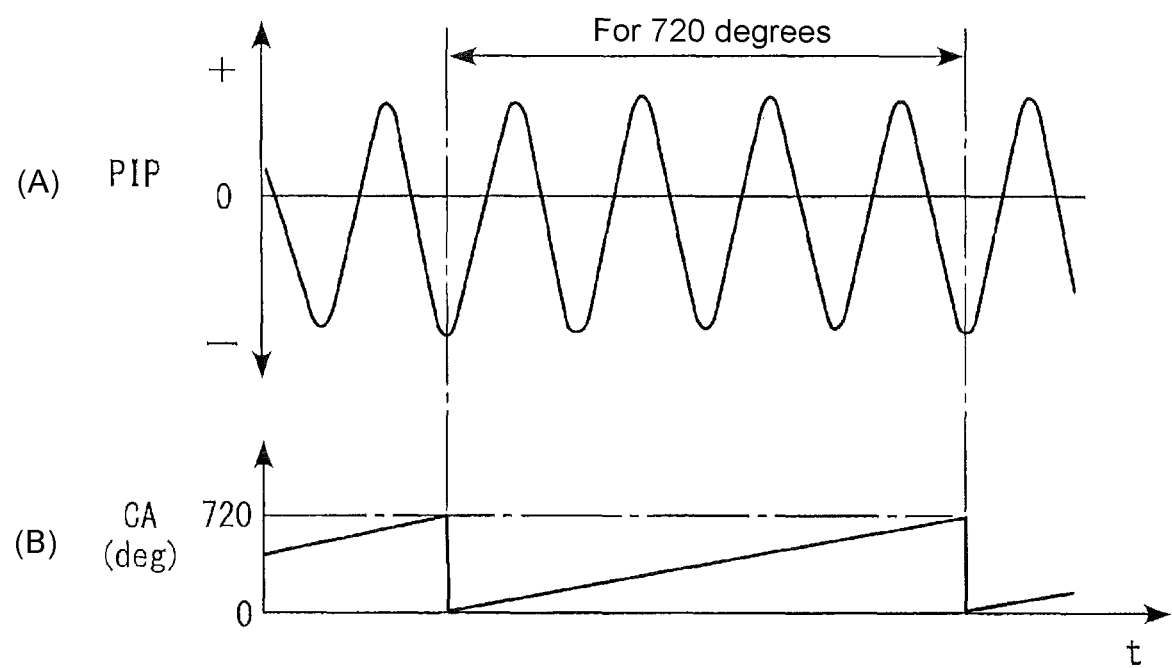
FIG. 3 includes (A) a diagram illustrating an example of the transition indicating the pulsation of the pressure inside the breather pipe as a wave form, and (B) a diagram illustrating the transition of the crank angle.

FIG. 3 shows an example of the transition of the pipe internal pressure PIP corresponding to the transition of the crank angle CA. As shown in FIG. 3, in the engine 3 having four cylinders 4, a predetermined pulsation of the pipe internal pressure PIP is generated in synchronization with the operation of the pistons 8 of the cylinders 4. Specifically, four pulsations of the pipe internal pressure PIP are generated as the crank shaft 3d rotates two times (the crank angle: 0 to 720 degrees).

Figure 4A:
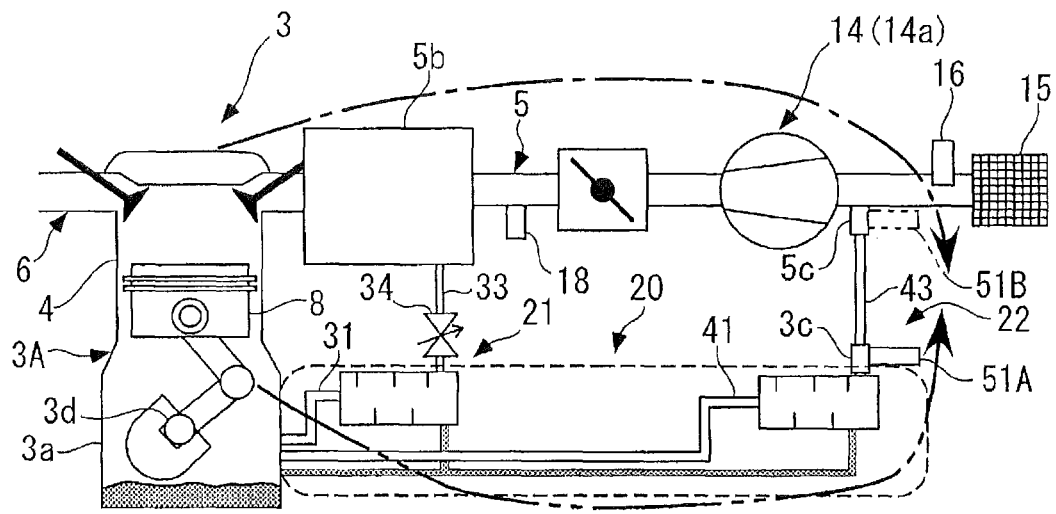
FIGS. 4A and 4B are diagrams for describing the pulsation of the pressure inside the breather pipe when the connection state of the breather pipe is proper.
Figure 4B:
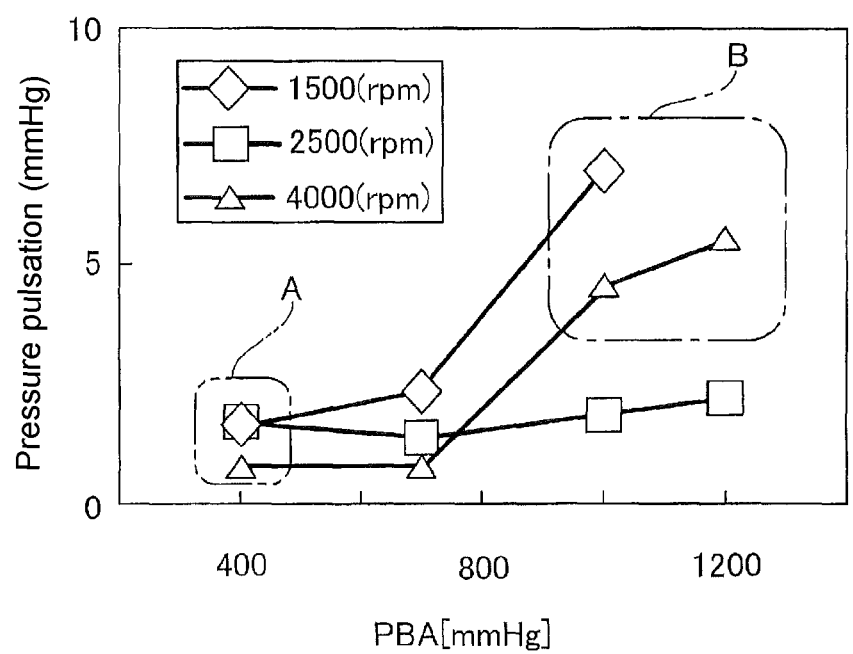

FIG. 4A illustrates the flow of the pressure transmission which generates the pulsation of the pipe internal pressure PIP when the connection state of the breather pipe 43 is proper. FIG. 4B illustrates the pressure pulsation at multiple (three in FIG. 4B) engine speeds NE in multiple operation states. The pressure pulsation of the vertical axis of FIG. 4B indicates the amplitude of the pulsation waveform generated by the pipe internal pressure PIP.

As shown in FIG. 4A, in this embodiment, when the load of the engine 3 is in a predetermined low load range, the pressure on the crank case 3a side travels on the path indicated by the long dashed double-short dashed line in FIG. 4A, that is, from the crank case 3a of the engine 3 to the breather pipe 43 via the second gas passage 41. In this case, the pressure pulsation inside the breather pipe 43 is dominantly generated by the pressure propagated from the crank case 3a side. On the contrary, when the load of the engine 3 is in a predetermined high load range, the pressure on the intake tube 5 side travels on the path indicated by the long dashed short dashed line in FIG. 4A, that is, from the combustion chamber 4a to the breather pipe 43 via the intake tube 5. In this case, the pressure pulsation of the breather pipe 43 is dominantly generated by the pressure on the intake tube 5 side.

As shown in FIG. 4B, in the case where the intake pressure PBA is relatively low and the load of the engine 3 is in the low load region, the pressure pulsation becomes relatively small (refer to the area A enclosed by the long dashed double-short dashed line) under a relatively wide range of the engine speed NE (1500 to 4000 rpm in FIG. 4B). On the contrary, in the case where the intake pressure PBA is relatively high and the load of the engine 3 is in the high load range, when the engine speed NE is the middle speed (2500 rpm in FIG. 4B), the pressure pulsation is almost the same as the low load range case described above, and when the engine speed NE is low speed (1500 rpm in FIG. 4B) and high speed (4000 rpm in FIG. 4B), the pressure pulsation is greater than the low load range case described above (refer to the area B enclosed by the long dashed short dashed line).

Figure 5A:
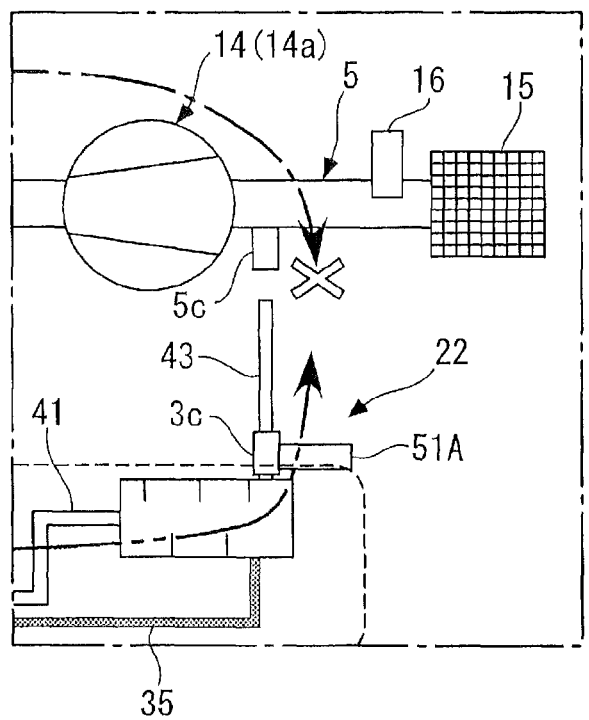
FIGS. 5A and 5B are diagrams for describing the pulsation of the pressure inside the breather pipe when the connection state of the breather pipe is faulty (the state in which the end portion on the intake passage side is detached).
Figure 5B:
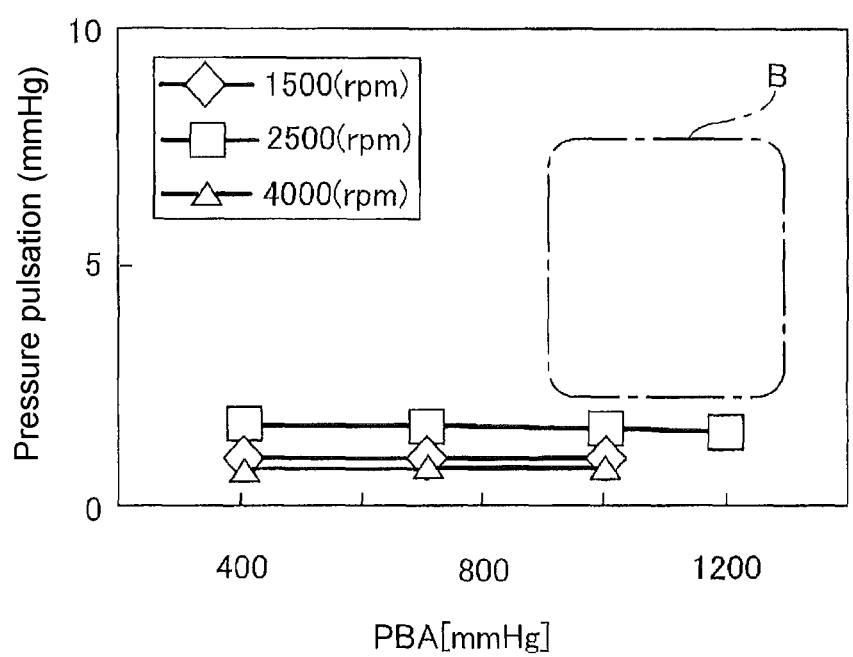

FIG. 5A illustrates the state in which the connection state of the breather pipe 43 is faulty and the end portion on the intake tube 5 side (the upper end portion in FIG. 5A) is detached. In this case, since the pipe internal pressure sensor 51A is attached to the engine side pipe mounting part 3c, the pressure pulsation by the blowby gas heading from the engine body 3A to the breather pipe 43 is detected by the pipe internal pressure sensor 51A, but the pressure pulsation by the intake air heading from the intake tube 5 to the breather pipe 43 is not detected. Therefore, as shown in FIG. 5B, the pressure pulsation which should be detected when the intake pressure PBA is relatively high and the load of the engine 3 is in the high load region is completely undetected in the area B. The similar is true to the case where the end portion of the breather pipe 43 on the engine body 3A side (the lower end portion in FIG. 5A) is detached (refer to FIG. 6A). Therefore, in the case where the pipe internal pressure sensor 51A is attached to the engine side pipe mounting part 3c, the faulty connection state due to detachment, etc., of the end portion of the breather pipe 43 on the intake tube 5 side and/or the engine body 3A side can be easily determined by the pressure pulsation detected when the load of the engine 3 is in the high load region being lower than the original value.

Figure 6A:
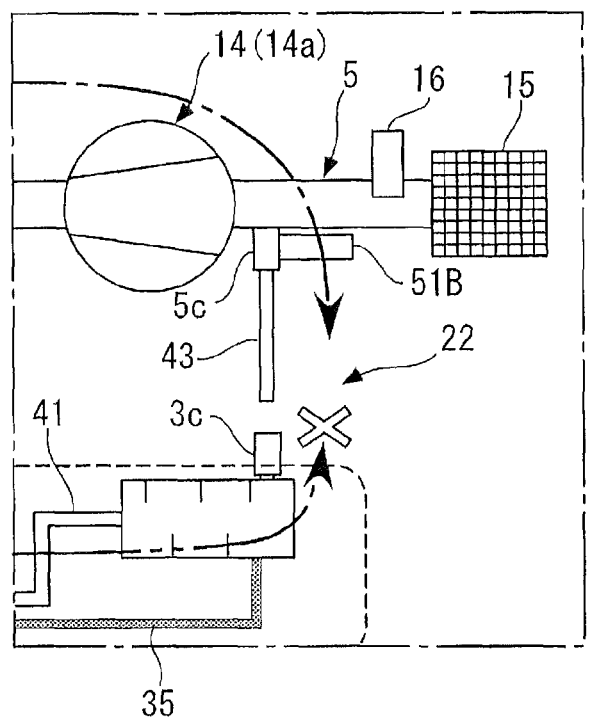
FIGS. 6A and 6B are diagrams for describing the pulsation of the pressure inside the breather pipe when the connection state of the breather pipe is faulty (the state in which the end portion on the engine body side is detached).
Figure 6B:
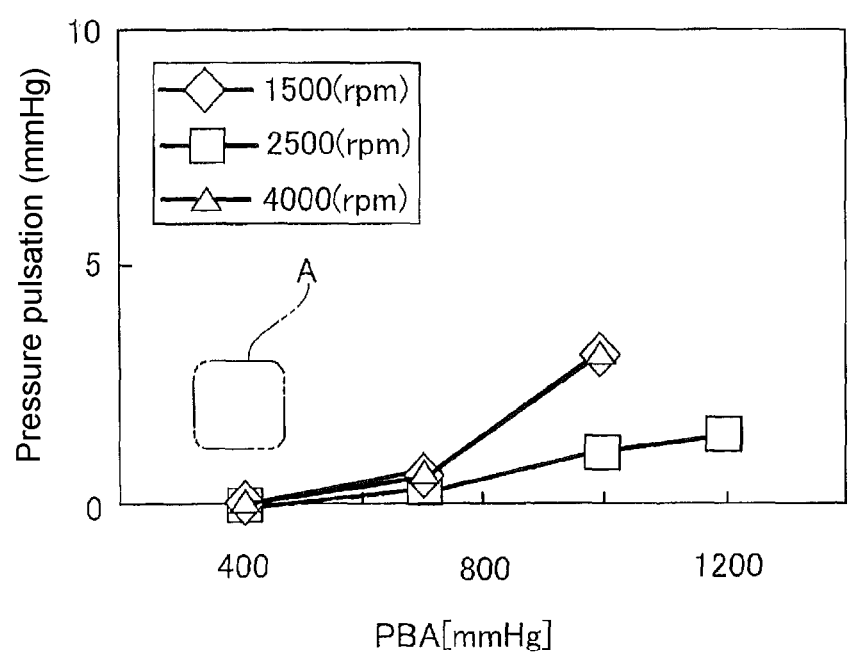

FIG. 6A illustrates the state in which the connection state of the breather pipe 43 is faulty and the end portion on the engine body 3A side (the lower end portion in FIG. 6A) is detached. FIG. 6A illustrates the state in which the pipe internal pressure sensor 51B is attached to the intake tube side pipe mounting part 5c, which is different from FIG. 5A described above. In this case, the pressure pulsation by the intake air heading from the intake tube 5 to the breather pipe 43 is detected by the pipe internal pressure sensor 51B, but the pressure pulsation by the blowby gas heading from the engine body 3A to the breather pipe 43 is not detected. Therefore, as shown in FIG. 6B, the pressure pulsation which should be detected when the intake pressure PBA is relatively low and the load of the engine 3 is in the low load region is completely undetected in the area A. The similar is true to the case where the end portion of the breather pipe 43 on the intake tube 5 side (the upper end portion in FIG. 6A) is detached (refer to FIG. 5A). Therefore, when the pipe internal pressure sensor 51B is attached to the intake tube side pipe mounting part 5c, the faulty connection state due to detachment, etc., of end portion of the breather pipe 43 on the engine body 3A side and/or the intake tube 5 side can be easily determined by the pressure pulsation detected when the load of the engine 3 is in the low load region being lower than the original value.

The determination of whether the load of the engine 3 is in the high load region or in the low load region mentioned above can be performed based on the magnitude of the opening angle of the throttle valve 17, the magnitude of the intake air quantity, the magnitude of the intake pressure PBA, and the like.

Figure 7:
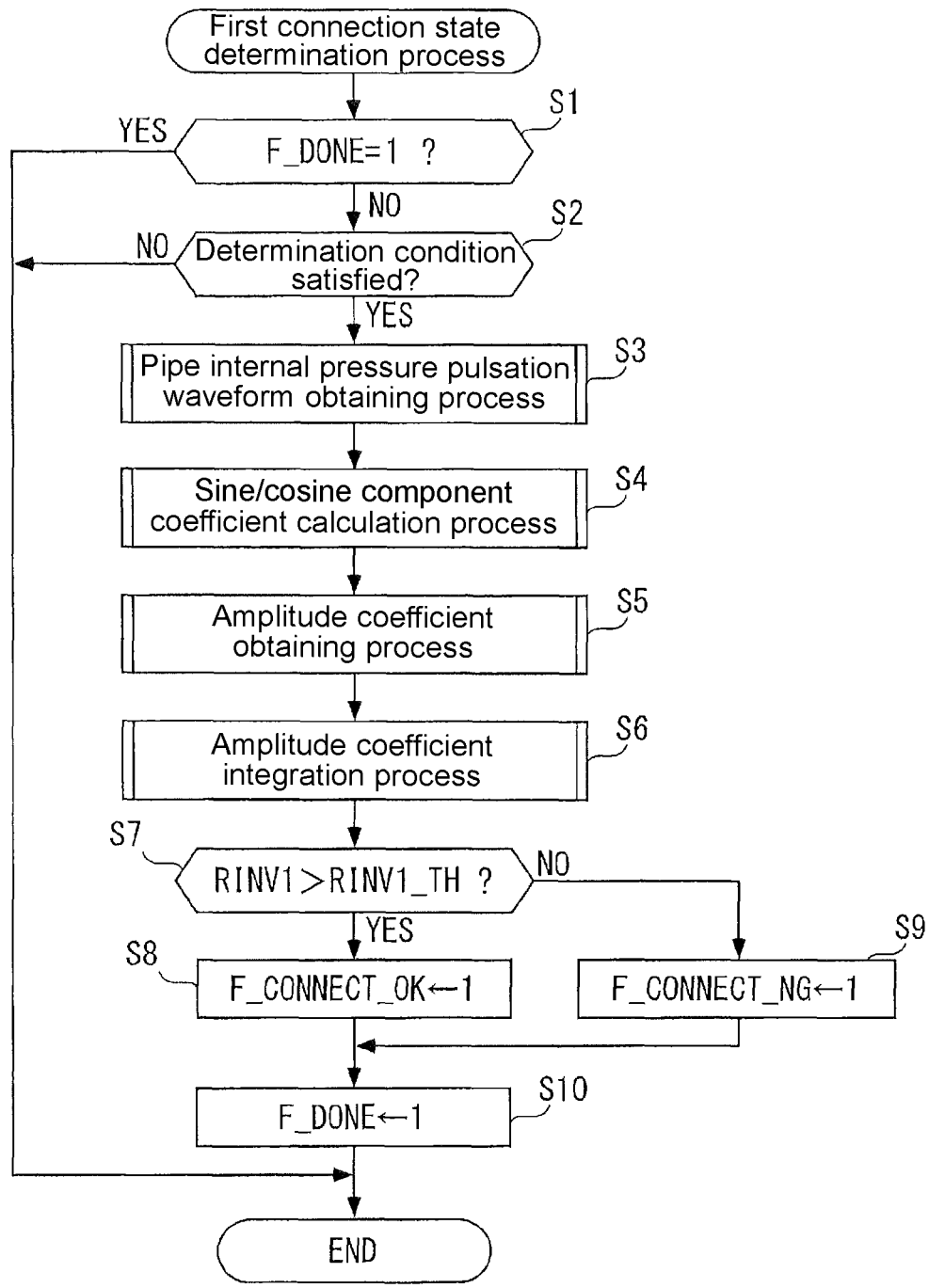
FIG. 7 is a flow chart illustrating the first connection state determination process.

Next, the connection state determination process for the breather pipe 43 is described with reference to FIG. 7. FIG. 7 is a flowchart illustrating the first connection state determination process. This process is to execute the connection state determination for the breather pipe 43 connected between the engine body 3A and the intake tube 5 on the upstream side of the compressor 14a.

Firstly, in Step 1 (depicted as "S1"; the same for other Steps), it is determined whether a determination completion flag F_DONE is "1" or not. If the determination result is YES, that is, if the connection state determination by this process has already been completed, the process is directly terminated. The determination completion flag F_DONE is reset to "0" when the engine 3 is started. Thereby, the connection state determination by this process is performed once per operation cycle that is from the start to the stop of the engine 3.

On the contrary, if the determination result in Step 1 described above is NO, it is determined whether a predetermined determination condition is satisfied or not (Step 2). A condition that, for example, the engine load (including the engine speed NE, the intake pressure PBA, the accelerator opening AP, and the like) is within a predetermined range suitable for executing the connection state determination for the breather pipe 43, is set as the determination condition. Therefore, if the engine load is out of the predetermined range and the determination condition is not satisfied (Step 2: NO), this process is directly terminated. On the contrary, if the determination condition is satisfied (Step 2: YES), a pipe internal pressure pulsation waveform obtaining process is executed (Step 3). The pipe internal pressure pulsation waveform obtaining process obtains a pipe internal pressure pulsation waveform f by sampling the data of the pipe internal pressure PIP detected by the pipe internal pressure sensor 51 for every predetermined crank angle (30 degrees, for example).

Next, the sine/cosine component coefficient described later which is correlated with the amplitude of the pipe internal pressure pulsation waveform f is calculated by using a Fourier series (Step 4). Specifically, the pipe internal pressure pulsation waveform f is indicated as the following formula (1) by the combination of the sine wave and the cosine wave.

$$f(t)=1+a_1 \sin(\omega t)+b_1 \cos(\omega t)+a_2 \sin(2\omega t)+b_2 \cos(2\omega t)+ \ldots +a_n \sin(n\omega t)+b_n \cos(n\omega t) \quad (1)$$

$\omega$: angle speed (one cycle is the crank angle of 720 degrees)

t: time

When the pipe internal pressure pulsation waveform f(t) of the formula (1) is multiplied by a sine wave of a predetermined frequency ($\sin(\omega t)$) and then the result is integrated for one cycle (for the crack angle of 720 degrees), only the result of the multiplication of the sine waves of the same frequency remains, and the other multiplied terms of sine waves of frequencies different to each other and the multiplied terms of all the cosine waves becomes the value of zero. As a result, the following formula (2) can be obtained.

$$\int_0^T f(t) \cdot \sin(\omega t) \cdot dt = \int_0^T \{1 + a_1\sin(\omega t) + b_1\cos(\omega t) + a_2\sin(2\omega t) + b_2\cos(2\omega t) + \ldots + a_n\sin(n\omega t) + b_n\cos(n\omega t)\} \cdot \sin(\omega t) \cdot dt \quad (2)$$

$$= \int_0^T \{\sin(\omega t) + a_1\sin(\omega t) \cdot \sin(\omega t) + b_1\cos(\omega t) \cdot \sin(\omega t) + a_2\sin(2\omega t) \cdot \sin(\omega t) + b_2\cos(2\omega t) \cdot \sin(\omega t) + \ldots + a_n\sin(n\omega t) \cdot \sin(\omega t) + b_n\cos(n\omega t) \cdot \sin(\omega t)\} \cdot dt$$

$$= \int_0^T \sin(\omega t) \cdot dt + \int_0^T a_1\sin^2(\omega t) \cdot dt +$$
$$\int_0^T b_1\cos(\omega t) \cdot \sin(\omega t) \cdot dt +$$
$$\int_0^T a_2\sin(2\omega t) \cdot \sin(\omega t) \cdot dt +$$
$$\int_0^T b_2\cos(2\omega t) \cdot \sin(\omega t) \cdot dt + \ldots +$$
$$\int_0^T a_n\sin(n\omega t) \cdot \sin(\omega t) \cdot dt +$$
$$\int_0^T b_n\cos(n\omega t) \cdot \sin(\omega t) \cdot dt$$

$$= \int_0^T a_1\sin^2(\omega t) \cdot dt$$

$$= \pi a_1$$

Then, a sine component coefficient $a_1$ that indicates the amplitude of the sine wave of the predetermined frequency can be obtained by the following formula (3).

$$a_1 = \frac{1}{\pi} \int_0^T f(t) \cdot \sin(\omega t) \cdot dt \quad (3)$$

Similar to the above, when the pipe internal pressure pulsation waveform f(t) of the formula (1) is multiplied by a cosine wave of a predetermined frequency ($\cos(\omega t)$) and then the result is integrated for one cycle, only the result of the multiplication of the same frequency components remains, and the other multiplied terms of frequency components different to each other and the multiplied terms of all the sine waves becomes the value of zero, as the same as the case of multiplying the sine wave of the predetermined frequency described above. As a result, the following formula (4) can be obtained.

$$\int_0^T f(t) \cdot \cos(\omega t) \cdot dt = \int_0^T \{1 + a_1\sin(\omega t) + b_1\cos(\omega t) + a_2\sin(2\omega t) + b_2\cos(2\omega t) + \ldots + a_n\sin(n\omega t) + b_n\cos(n\omega t)\} \cdot \cos(\omega t) \cdot dt \quad (4)$$

$$= \int_0^T \{\cos(\omega t) + a_1\sin(\omega t) \cdot \cos(\omega t) + b_1\cos(\omega t) \cdot \cos(\omega t) + a_2\sin(2\omega t) \cdot \cos(\omega t) + b_2\cos(2\omega t) \cdot \cos(\omega t) + \ldots + a_n\sin(n\omega t) \cdot \cos(\omega t) + b_n\cos(n\omega t) \cdot \cos(\omega t)\} \cdot dt$$

$$= \int_0^T \cos(\omega t) \cdot dt + \int_0^T a_1\sin(\omega t) \cdot \cos(\omega t) \cdot dt + \int_0^T b_1\cos^2(\omega t) \cdot dt +$$
$$\int_0^T a_2\sin(2\omega t) \cdot \cos(\omega t) \cdot dt +$$
$$\int_0^T b_2\cos(2\omega t) \cdot \cos(\omega t) \cdot dt + \ldots +$$
$$\int_0^T a_n\sin(n\omega t) \cdot \cos(\omega t) \cdot dt +$$
$$\int_0^T b_n\cos(n\omega t) \cdot \cos(\omega t) \cdot dt$$

$$= \int_0^T b_1\cos^2(\omega t) \cdot dt$$

$$= \pi b_1$$

Then, a cosine component coefficient $b_1$ that indicates the amplitude of the cosine wave of the predetermined frequency can be obtained by the following formula (5).

$$b_1 = \frac{1}{\pi} \int_0^T f(t) \cdot \cos(\omega t) \cdot dt \quad (5)$$

Next, in Step 5 successive to Step 4 of FIG. 7, an amplitude calculation process for quantifying the amplitude of the pipe internal pressure pulsation waveform f(t) is executed. Specifically, an amplitude coefficient R is the square root value of the sum of squares of the sine component coefficient $a_1$ calculated by the formula (3) and the cosine component coefficient $b_1$ calculated by the formula (5), calculated by using the following formula (6).

$$R = \sqrt{a_1^2 + b_1^2} \quad (6)$$
$$= \sqrt{\left\{\frac{1}{\pi}\int_0^T f(t) \cdot \sin(\omega t) \cdot dt\right\}^2 + \left\{\frac{1}{\pi}\int_0^T f(t) \cdot \cos(\omega t) \cdot dt\right\}^2}$$

Next, in Step 6 successive to Step 5 of FIG. 7, an amplitude coefficient integration process is executed by using the amplitude coefficient R calculated by the formula (6). Specifically, an amplitude coefficient integration value RINV1 is calculated by integrating the amplitude coefficient R for multiple cycles that is predetermined (10 cycles, for example). Then, it is determined whether the amplitude coefficient integration value RINV1 is greater than a predetermined first determination threshold RINV1_TH or not (Step 7). The first determination threshold RINV1_TH is set by multiple maps suitable for the connection state determination for the breather pipe 43 by comparison to the amplitude coefficient integration value RINV1 according to the operation state of the engine 3 (the engine speed NE, the engine load, the intake air quantity, and the like, for example).

If the amplitude coefficient integration value RINV1 is greater than the first determination threshold RINV1_TH (Step 7: YES), it is determined that the amplitude of the pipe internal pressure pulsation waveform f is sufficiently large and the connection state of the breather pipe 43 is proper, and a proper connection flag F_CONNECT_OK is set to "1" to indicate the above (Step 8). On the contrary, if the amplitude coefficient integration value RINV1 is less than or equal to the first determination threshold RINV1_TH (Step 7: NO), it is determined that the amplitude of the pipe internal pressure pulsation waveform f is small and the connection state of the breather pipe 43 is faulty, and a faulty connection flag F_CONNECT_NG is set to "1" to indicate the above (Step 9). Then, after executing Step 8 or Step 9 described above, the determination completion flag F_DONE is set to "1" to indicate the completion of the connection state determination for the breather pipe 43 (Step 10), and this process is terminated.

As described above, according to the first connection state determination process, the amplitude can be quantified by calculating the amplitude coefficient R correlated with the amplitude of the pipe internal pressure pulsation waveform f by using the Fourier series corresponding to the pipe internal pressure pulsation waveform f. Then, by comparing the amplitude coefficient integration value RINV1, which is obtained by integrating the amplitude coefficient R for multiple cycles, to the appropriately set first determination threshold RINV1_TH, the connection state of the breather pipe 43 can be determined in a short period of time while improving the precision of the determination.

Figure 8:
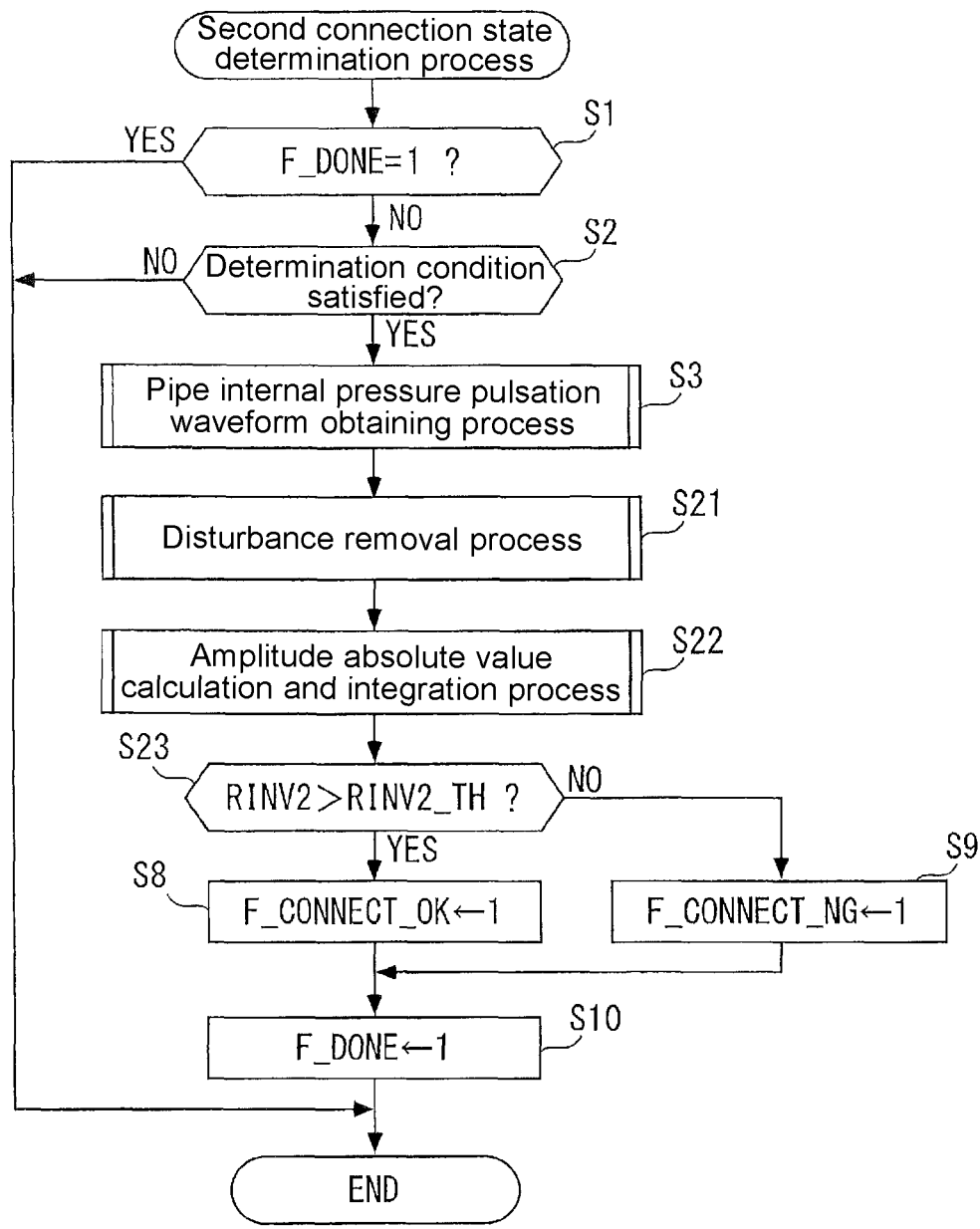
FIG. 8 is a flow chart illustrating the second connection state determination process.

Next, other connection state determination processes are described with reference to FIGS. 8 to 13D. FIG. 8 is a flowchart illustrating the second connection state determination process, and this process determines the connection state by using the absolute value of the amplitude of the pulsation waveform. In this process, the same step number is assigned to the same step found in the first connection state determination process described above, and the detailed description thereof is omitted.

As shown in FIG. 8, in the second connection state determination process, firstly, it is determined whether the determination completion flag F_DONE is "1" or not (Step 1), as the same as the first connection state determination process described above. If the determination result is YES, which means the connection state determination by this process has already completed, the process is directly terminated. If the determination result of Step 1 is NO, it is determined whether the predetermined determination condition is satisfied or not in successive Step 2. If the determination result is NO, which means the determination condition is not satisfied, the process is directly terminated. On the contrary, if the determination condition is satisfied, the pipe internal pressure pulsation waveform obtaining process is executed in successive Step 3.

Figure 11A:
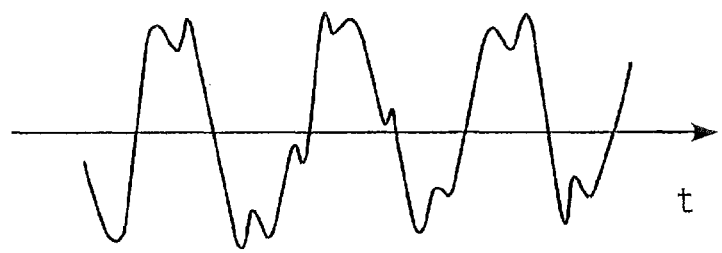
FIGS. 11A, 11B, 11C and 11D are diagrams for describing the detection process of the pulsation wave form of the pipe internal pressure and the determination in the second connection state determination process.

FIG. 11A illustrates an example of the pulsation waveform based on the detection result of the pipe internal pressure sensor 51. As shown in FIG. 11A, since the pulsation waveform includes disturbance such as noises, a disturbance removal process is performed in Step 21 of FIG. 8. Specifically, in the disturbance removal process, a filter process by a bandpass filter which allows only a specific range of frequency to pass is executed by using the following formula (7), for example.

$$FLT(i) = \sum_{k=0}^{K} b(k) \cdot KACT(i-k) + \sum_{k=1}^{K} a(k) \cdot FLT(i-k) \quad (7)$$

Here, FLT is the filter value of the pipe internal pressure PIP, KACT is the detection value of the pipe internal pressure sensor 51, a and b are the predetermined filter coefficients, and i is the sampling number. K is a constant that is determined by the order of the bandpass filter.

By executing the filter process described above, as shown in FIG. 11B, the shaped waveform of the pressure pulsation from which the noises are removed (hereinafter, referred to as "shaped waveform") can be obtained.

Next, in Step 22 successive to Step 21 of FIG. 8, an amplitude absolute value calculation and integration process for the shaped waveform is executed. Specifically, the absolute value Ra (the shaded part shown in FIG. 11C) of the amplitude of the shaped waveform for one cycle (the crank angle of 720 degrees) is calculated. Then, the integration value of the amplitude absolute value RINV2 is calculated by integrating the absolute value Ra for multiple cycles that is predetermined (10 cycles, for example) while calculating the amplitude absolute value Ra in each of the cycles. Then, it is determined whether the obtained integration value RINV2 is greater than the second determination threshold RINV2_TH or not (Step 23). The second determination threshold RINV2_TH is set by multiple maps suitable for the connection state determination for the breather pipe 43 by comparison to the integration value RINV2 of the amplitude absolute value according to the operation state of the engine 3, as the same as the first determination threshold RINV1_TH described above.

If the determination result of Step 23 described above is YES, it is determined that the amplitude of the pipe internal pressure pulsation waveform is sufficiently large and the connection state of the breather pipe 43 is proper, and Step 8 described above is executed. On the contrary, if the determination result of Step 23 is NO, it is determined that the amplitude of the pipe internal pressure pulsation waveform is small and the connection state of the breather pipe 43 is faulty, and Step 9 described above is executed. Then, Step 10 is executed after executing Step 8 or Step 9, and this process is terminated.

As described above, according to the second connection state determination process, the amplitude of the pipe internal pressure pulsation waveform can be quantified by calculating the amplitude absolute value Ra. Then, by comparing the integration value RINV2 of the amplitude absolute value, which is obtained by integrating the amplitude absolute value Ra for multiple cycles, to the appropriately set second determination threshold RINV2_TH, the connection state of the breather pipe 43 can be determined in a short period of time while improving the precision of the determination.

Figure 9:
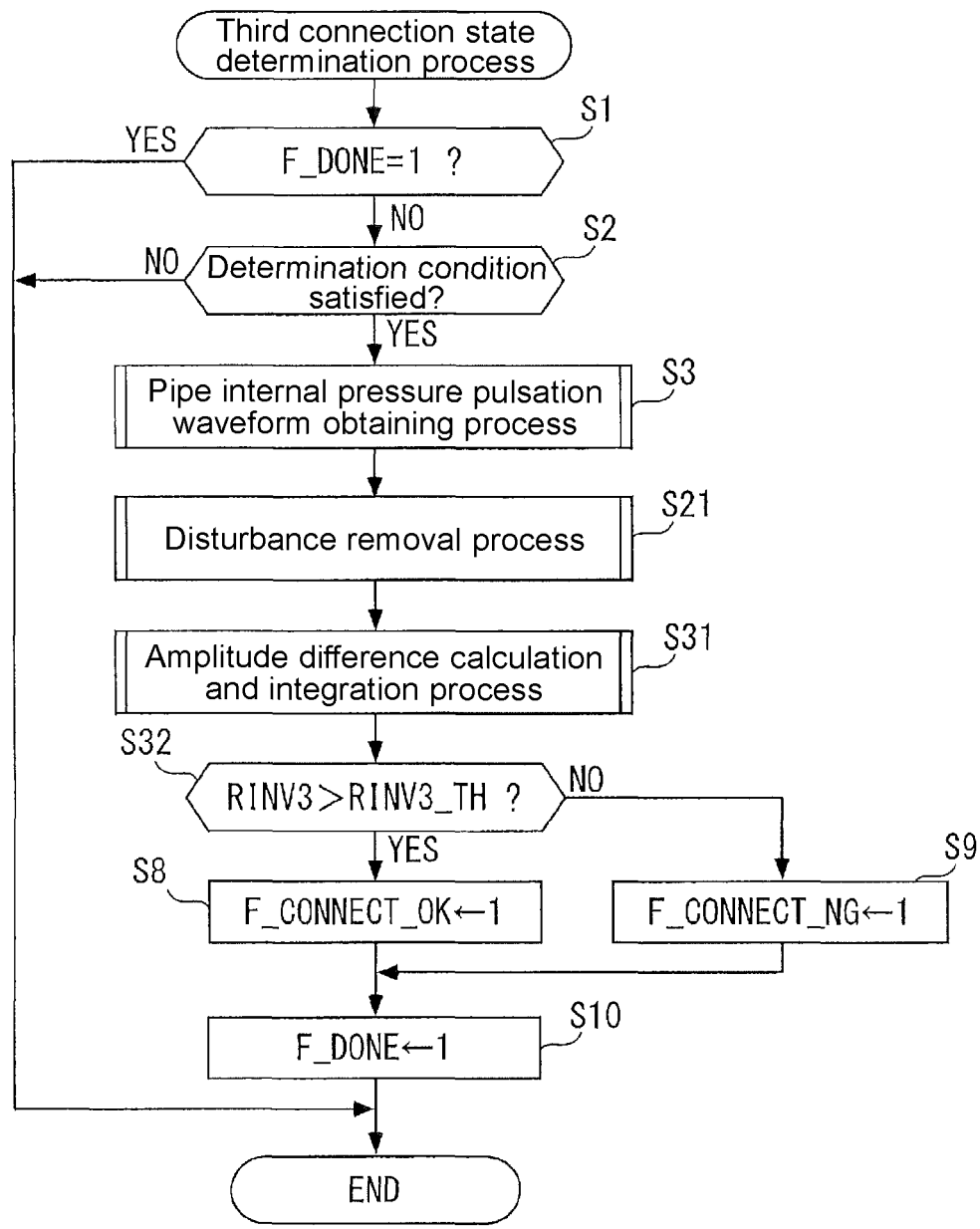
FIG. 9 is a flow chart illustrating the third connection state determination process.

FIG. 9 is a flowchart illustrating the third connection state determination process, and this process determines the connection state by using the difference between the maximum value and the minimum value of the amplitude of the pulsation waveform. In this process, the same step number is assigned to the same step found in the first and second connection state determination processes described above, and the detailed description thereof is omitted.

As shown in FIG. 9, in the third connection state determination process, firstly, it is determined whether the determination completion flag F_DONE is "1" or not (Step 1), as the sane as the first and second connection state determination processes. If the determination result is YES, which means the connection state determination by this process has already completed, the process is directly terminated. If the determination result of Step 1 is NO, it is determined whether the predetermined determination condition is satisfied or not in successive Step 2. If the determination result is NO, which means the determination condition is not satisfied, the process is directly terminated. On the contrary, if the determination condition is satisfied, the pipe internal pressure pulsation waveform obtaining process and the disturbance removal process are executed (Steps 3 and 21) as the same as the second connection state determination process.

Figure 11B:
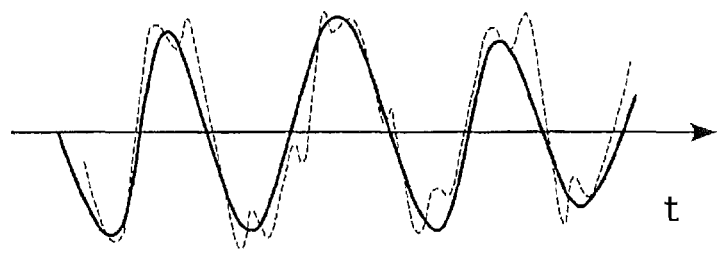
Figure 11C:
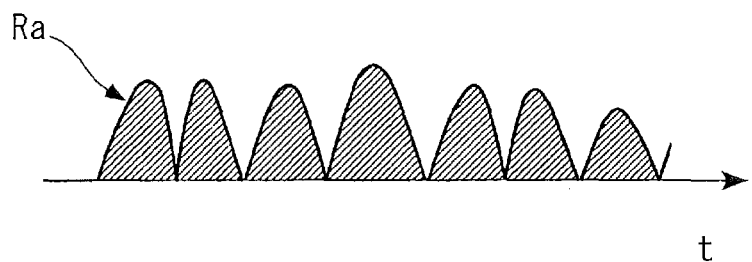
Figure 11D:
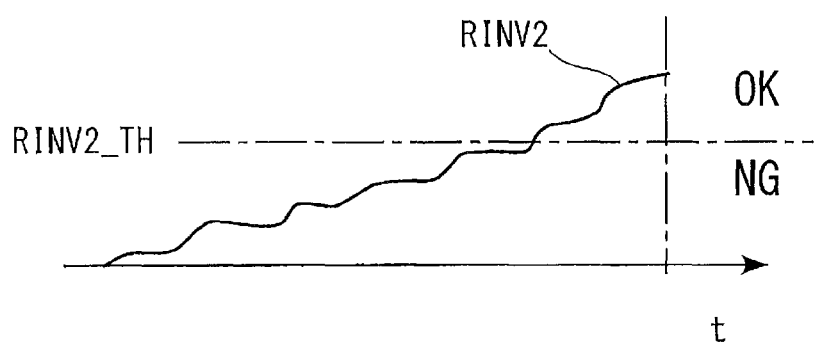
Figure 12A:
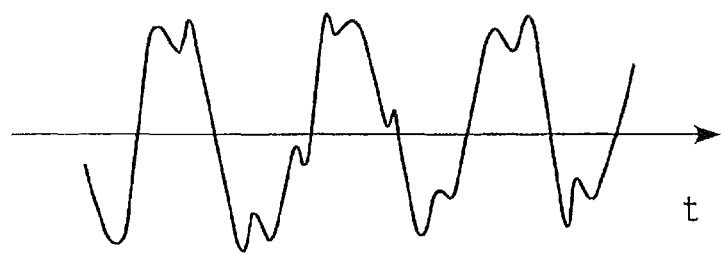
FIGS. 12A, 12B, 12C and 12D are diagrams for describing the detection process of the pulsation wave form of the pipe internal pressure and the determination in the third connection state determination process.
Figure 12B:
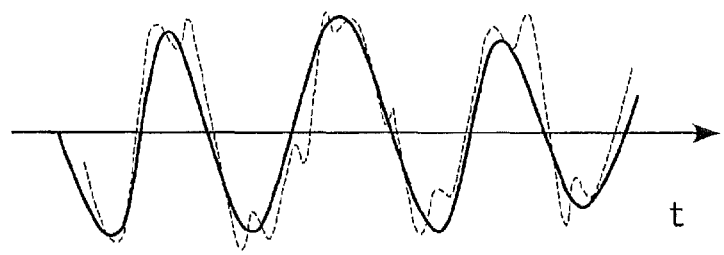
Figure 12C:
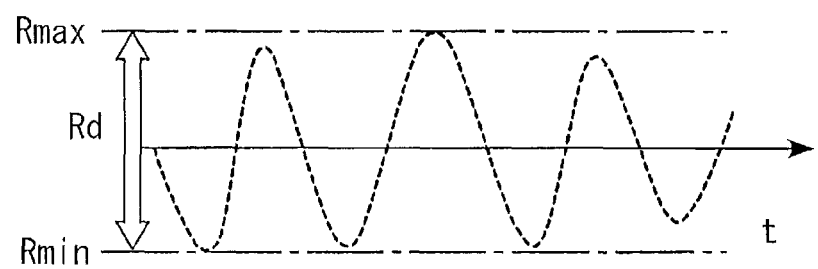
Figure 12D:
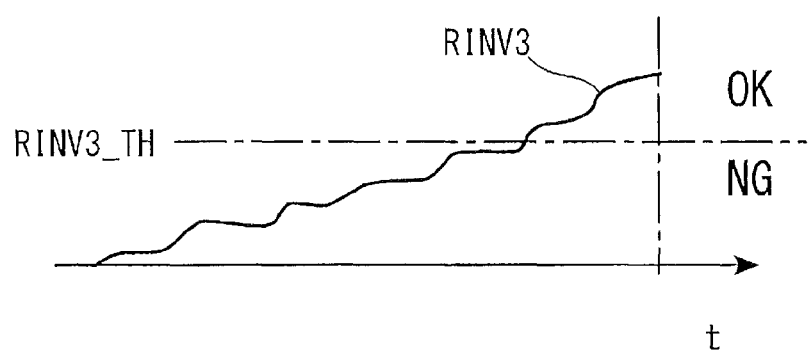

Thereby, as shown in FIGS. 12A and 12B, the waveforms as the same as FIGS. 11A and 11B described above, that is, the pulsation waveform based on the detection result of the pipe internal pressure sensor 51 and the waveform of the pressure pulsation shaped by the filter process (the shaped waveform), can be obtained.

Next, in Step 31 successive to Step 21 of FIG. 9, an amplitude difference calculation and integration process for the shaped waveform is executed. Specifically, a difference Rd between an amplitude maximum value Rmax and an amplitude minimum value Rmin of the shaped waveform in one cycle (the crank angle of 720 degrees) is calculated. Then, the amplitude difference integration value RINV3 is calculated by integrating the difference Rd for multiple cycles that is predetermined (10 cycles, for example) while calculating the difference Rd in each of the cycles. Then, it is determined whether the obtained integration value RINV3 is greater than the third determination threshold RINV3_TH or not (Step 32). The third determination threshold RINV3_TH is set by multiple maps suitable for the connection state determination for the breather pipe 43 by comparison to the amplitude difference integration value RINV3 according to the operation state of the engine 3, as the same as the first determination threshold RINV1_TH described above.

If the determination result of Step 32 described above is YES, which means RINV3>RINV3_TH, it is determined that the amplitude of the pipe internal pressure pulsation waveform is sufficiently large and the connection state of the breather pipe 43 is proper, and Step 8 described above is executed. On the contrary, if the determination result of Step 32 is NO, it is determined that the amplitude of the pipe internal pressure pulsation waveform is small and the connection state of the breather pipe 43 is faulty, and Step 9 described above is executed. Then, Step 10 is executed after executing Step 8 or Step 9, and this process is terminated, as the same as the first and second connection state determination processes.

As described above, according to the third connection state determination process, the amplitude of the pipe internal pressure pulsation waveform can be quantified by calculating the difference Rd between the maximum value Rmax and the minimum value Rmin of the amplitude in the pipe internal pressure pulsation waveform. Then, by comparing the amplitude difference integration value RINV3, which is obtained by integrating the difference Rd of the amplitude for multiple cycles, to the appropriately set third determination threshold RINV3_TH, the connection state of the breather pipe 43 can be determined in a short period of time while improving the precision of the determination.

Figure 10:
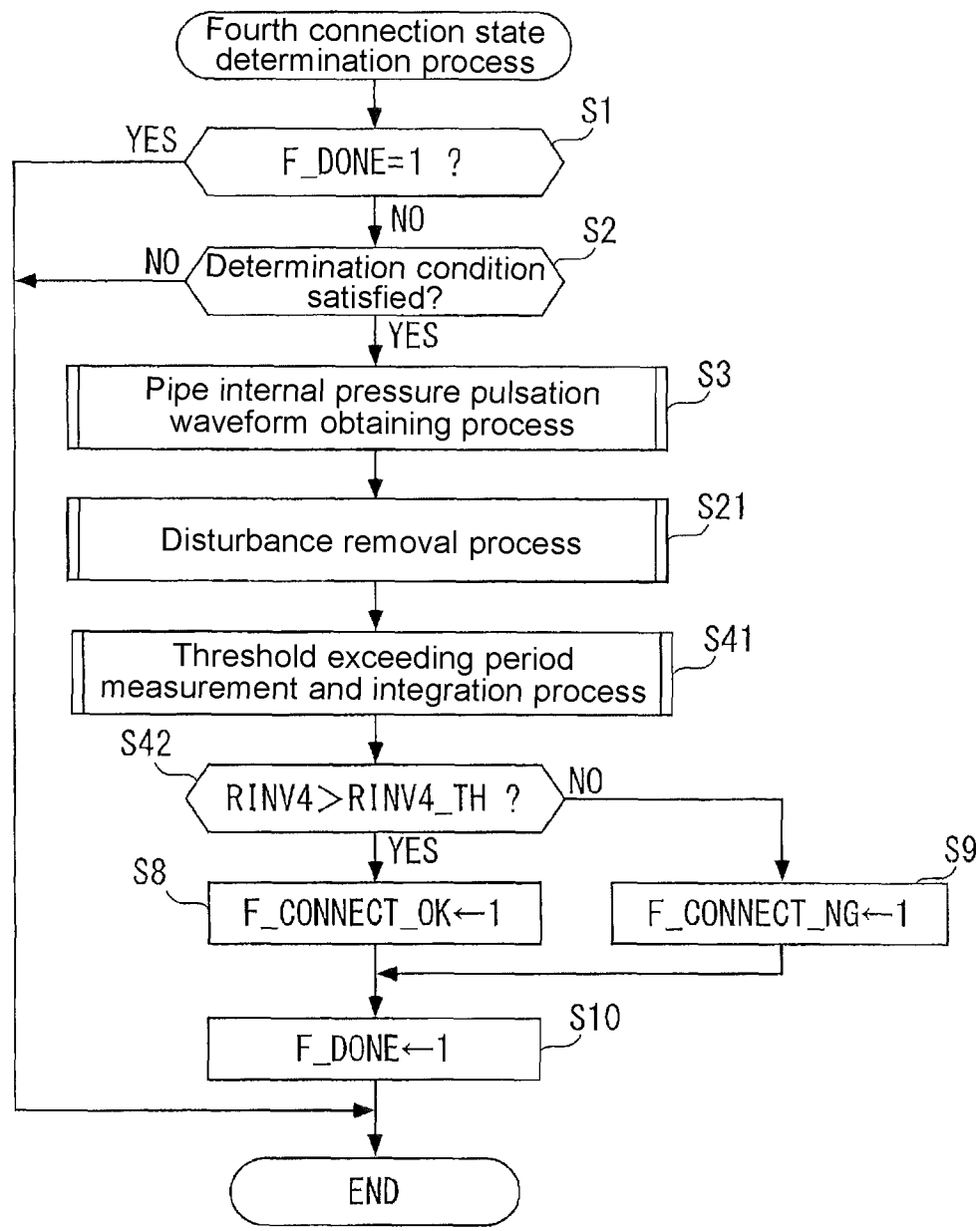
FIG. 10 is a flow chart illustrating the fourth connection state determination process.

FIG. 10 is a flowchart illustrating the fourth connection state determination process, and this process determines the connection state by using the period of time during which the amplitude of the pulsation waveform exceeds a predetermined threshold. In this process, the same step number is assigned to the same step found in the first and second connection state determination processes described above, and the detailed description thereof is omitted.

As shown in FIG. 10, in the fourth connection state determination process, firstly, it is determined whether the determination completion flag F_DONE is "1" or not (Step 1), as the sane as the first to third connection state determination processes described above. If the determination result is YES, which means the connection state determination by this process has already completed, the process is directly terminated. If the determination result of Step 1 is NO, it is determined whether the predetermined determination condition is satisfied or not in successive Step 2. If the determination result is NO, which means the determination condition is not satisfied, the process is directly terminated. On the contrary, if the determination condition is satisfied, the pipe internal pressure pulsation waveform obtaining process and the disturbance removal process are executed (Steps 3 and 21) as the same as the second and third connection state determination processes.

Figure 13A:
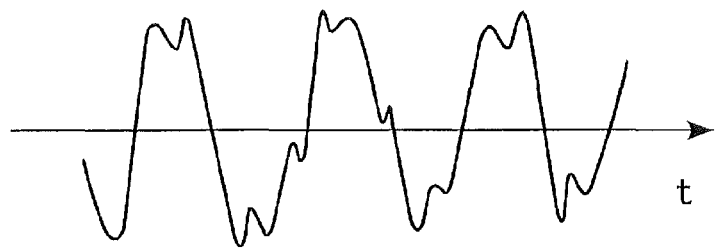
FIGS. 13A, 13B, 13C and 13D are diagrams for describing the detection process of the pulsation wave form of the pipe internal pressure and the determination in the fourth connection state determination process.
Figure 13B:
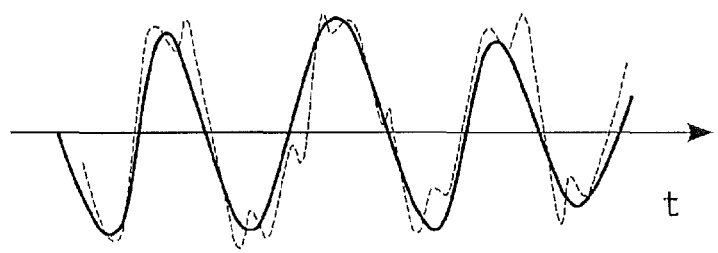
Figure 13C:
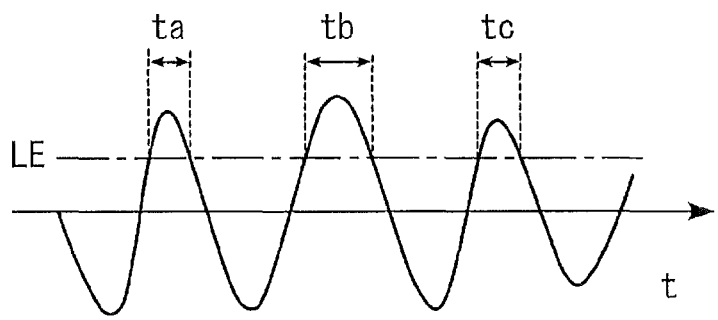
Figure 13D:
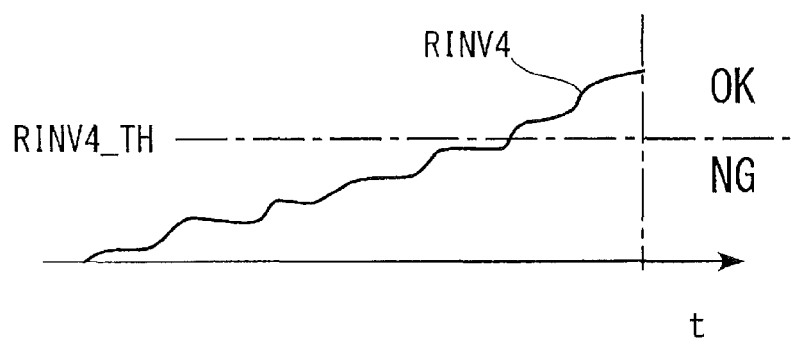

Thereby, as shown in FIGS. 13A and 13B, the waveforms as the same as FIGS. 11A and 11B described above, that is, the pulsation waveform based on the detection result of the pipe internal pressure sensor 51 and the waveform of the pressure pulsation shaped by the filter process (the shaped waveform), can be obtained.

Next, in Step 41 successive to Step 21 of FIG. 10, a threshold exceeding period measurement and integration process for the shaped waveform is executed. Specifically, a period of time (the period of time ta, tb and tc in FIG. 13C) during which the shaped waveform exceeds a predetermined threshold LE in one cycle (the crank angle of 720 degrees) is measured. Then, the threshold exceeding period integration value RINV4 is calculated by integrating the period of time during which the threshold LE is exceeded for multiple cycles that is predetermined (10 cycles, for example) while measuring the period of time in each of the cycles. Then, it is determined whether the obtained threshold exceeding period integration value RINV4 is greater than the fourth determination threshold RINV4_TH or not (Step 42). The fourth determination threshold RINV4_TH is set by multiple maps suitable for the connection state determination for the breather pipe 43 by comparison to the threshold exceeding period integration value RINV4 according to the operation state of the engine 3, as the same as the first determination threshold RINV1_TH described above.

If the determination result of Step 42 described above is YES, which means RINV4>RINV4_TH, it is determined that the amplitude of the pipe internal pressure pulsation waveform is sufficiently large and the connection state of the breather pipe 43 is proper, and Step 8 described above is executed. On the contrary, if the determination result of Step 42 is NO, it is determined that the amplitude of the pipe internal pressure pulsation waveform is small and the connection state of the breather pipe 43 is faulty, and Step 9 described above is executed. Then, Step 10 is executed after executing Step 8 or Step 9, and this process is terminated, as the same as the first to third connection state determination processes described above.

As described above, according to the fourth connection state determination process, the amplitude of the pipe internal pressure pulsation waveform can be quantified by measuring the threshold exceeding period. Then, by comparing the threshold exceeding period integration value RINV4, which is obtained by integrating the threshold exceeding time for multiple cycles, to the appropriately set fourth determination threshold RINV4_TH, the connection state of the breather pipe 43 can be determined in a short period of time while improving the precision of the determination.

The present disclosure is not limited to the embodiments described above, and is enabled in various aspects. The first to fourth connection state determination processes use the amplitude coefficient R, the amplitude absolute value Ra, the amplitude difference Rd and the threshold LE exceeding period as parameters for quantifying the amplitude of the pipe internal pressure pulsation waveform, but the present disclosure is not limited thereto. It is possible to use other parameters that can be used for determining the quality of the connection state of the breather pipe 43 by utilizing the pulsation of the pipe internal pressure PIP or the waveform thereof.

The detailed configurations of the engine 3 and the blowby gas reduction device 20 (the first and second reduction devices 21 and 22) indicated in the embodiments are merely examples and can be appropriately modified within the scope of the spirit of the present disclosure.

What is claimed is:

1. A connection state determination device for a breather pipe in an internal combustion engine having a supercharger that determines a connection state of the breather pipe connected between an engine body including a crank case and an intake passage on an upstream side of a compressor of the supercharger and communicates the crank case and the intake passage, the connection state determination device for the breather pipe comprising a pipe internal pressure sensor that detects pressure inside the breather pipe, a pulsation waveform obtaining part for obtaining pulsation due to variation of the pressure inside the breather pipe as a pulsation waveform based on the pressure detected, and a connection state determination part that determines the connection state of the breather pipe based on the pulsation waveform according to one of a first condition, a second condition, a third condition and a fourth condition, wherein an intake passage side pipe connection part for connecting an end portion of the breather pipe is disposed to the intake passage, an engine body side pipe connection part for connecting an other end portion of the breather pipe is disposed to the engine body, and the pipe internal pressure sensor is attached to the intake passage side pipe connection part or the engine body side pipe connection part, wherein in the first condition, the connection state determination device for the breather pipe further comprising:

a sine/cosine component coefficient calculation part that calculates a sine component coefficient and a cosine component coefficient respectively correlated with amplitude of a sine wave and amplitude of a cosine wave of a predetermined frequency by multiplying a Fourier series corresponding to the pulsation waveform by the sine wave and the cosine wave of the predetermined frequency respectively and integrating a result for one cycle of the pulsation waveform, an amplitude coefficient obtaining part that obtains an amplitude coefficient correlated with amplitude of the pulsation waveform by calculating a square root value of a sum of squares of the sine component coefficient and the cosine component coefficient, and an amplitude coefficient integration value obtaining part that obtaining an amplitude coefficient integration value by integrating the amplitude coefficient for a plurality of cycles that is predetermined, wherein the connection state determination part determines the connection state of the breather pipe by comparing the amplitude coefficient integration value to a predetermined first determination threshold, wherein in the second condition, the connection state determination device for the breather pipe further comprising:

an amplitude absolute value calculation part that calculates an amplitude absolute value by integrating an absolute value of amplitude of the pulsation waveform in one cycle, and an obtaining part for an integration value of the amplitude absolute value that obtains the integration value of the amplitude absolute value by integrating the amplitude absolute value for a plurality of cycles that is predetermined, wherein the connection state determination part determines the connection state of the breather pipe by comparing the integration value of the amplitude absolute value to predetermined second determination threshold, wherein in the third condition, the connection state determination device for the breather pipe further comprising:

an amplitude difference calculation part that calculates a difference between a maximum value and a minimum value of the amplitude of the pulsation waveform in one cycle, and an amplitude difference integration value obtaining part that obtains an amplitude difference integration value by integrating the difference for a plurality of cycles that is predetermined, wherein the connection state determination part determines the connection state of the breather pipe by comparing the amplitude difference integration value to a predetermined third determination threshold, wherein in the fourth condition, the connection state determination device for the breather pipe further comprising:

a threshold exceeding period measurement part that measures a period of time during which a predetermined threshold is exceeded by amplitude of the pulsation waveform in one cycle as a threshold exceeding period, and a threshold exceeding period integration value obtaining part that obtains a threshold exceeding period integration value by integrating the threshold exceeding period for a plurality of cycles that is predetermined, wherein the connection state determination part determines the connection state of the breather pipe by comparing the threshold exceeding period integration value to a predetermined fourth threshold.

2. The connection state determination device for the breather pipe according to claim 1, wherein the connection state determination part determines the connection state of the breather pipe based on amplitude of the pulsation waveform when load of the internal combustion engine is in a predetermined low load range.

3. The connection state determination device for the breather pipe according to claim 2, wherein the connection state determination part determines the connection state of the breather pipe based on the amplitude of the pulsation waveform when the load of the internal combustion engine is in a predetermined high load range that is higher than the predetermined low load range.

* * * * *